United States Patent [19]
Floyd et al.

[11] Patent Number: 5,505,950
[45] Date of Patent: Apr. 9, 1996

[54] METHOD OF PACKAGING PERISHABLE FOOD OR HORTICULTURAL PRODUCTS

[75] Inventors: Stan L. Floyd, Enumclaw; Herbert D. Muise, Tumwater; Mark A. Stanish, Seattle, all of Wash.

[73] Assignee: Weyerhaeuser Company, Tacoma, Wash.

[21] Appl. No.: 754,978

[22] Filed: Sep. 4, 1991

Related U.S. Application Data

[63] Continuation-in-part of Ser. No. 577,990, Sep. 5, 1990, Pat. No. 5,458,899.

[51] Int. Cl.$^6$ ..................................................... A23B 7/148
[52] U.S. Cl. ........................ 426/404; 426/319; 426/395; 426/396; 426/411; 426/415; 426/416; 426/419; 426/524; 62/100; 206/524.8
[58] Field of Search ..................................... 426/393, 394, 426/395, 396, 404, 415, 416, 302, 326, 56, 411, 319, 524, 419; 62/100; 206/524.8

[56] References Cited

U.S. PATENT DOCUMENTS

| Re. 21,144 | 7/1939 | Dodge | 426/393 |
|---|---|---|---|
| 880,414 | 2/1908 | Sprague | 426/419 |
| 1,821,106 | 9/1931 | Milani | 426/419 |
| 1,853,719 | 4/1932 | Bradbury | 426/109 |
| 2,164,025 | 6/1939 | Schwertfeger | 99/171 |
| 2,452,174 | 10/1948 | Arnold | 99/171 |
| 2,467,268 | 4/1949 | Merkle | 426/109 |
| 2,496,731 | 2/1950 | Longo | 426/109 |
| 2,684,907 | 7/1954 | Brunsing | 426/393 |
| 2,774,230 | 12/1956 | Kasser | 62/169 |

(List continued on next page.)

FOREIGN PATENT DOCUMENTS

| 21156/29 | 7/1929 | Australia | 426/109 |
|---|---|---|---|
| 21155/29 | 7/1929 | Australia | 426/109 |
| 87114588 | 10/1987 | European Pat. Off. . | |
| 0253648 | 1/1988 | European Pat. Off. . | |
| 261930 | 3/1988 | European Pat. Off. . | |
| 0335682 | 10/1989 | European Pat. Off. . | |
| 2031 | 12/1899 | United Kingdom . | |
| 1264484 | 2/1972 | United Kingdom | 426/109 |

OTHER PUBLICATIONS

International Search Report, PCT/US91/06341 (3pp).
Publication of Modern Packaging entitled *Controlling Atmosphere In a Fresh–Fruit Package* by P. Veeraju and M. Karel, vol. 40, pp. 169–172, 254 (1966).
Publication of Centre National de la Recherche Scientifique entitled *Plastic Packaging Destined for Vegetable Conservation and Notably for Fruits* by P. Marcellin, Paris, France (1960).
Technical Bulletin No. 160, Published by Eval Company of America and entitled "EVAL"® Films the Ultimate Laminating Film for Barrier Packaging Applications.

*Primary Examiner*—Helen Pratt
*Attorney, Agent, or Firm*—Klarquist Sparkman Campbell Leigh & Whinston

[57] ABSTRACT

An improved method is described for use in packaging a wide variety of products, and in particular perishable food and horticultural products. The products are placed within a container of the type which establishes a modified atmosphere environment therein and is cooled, as by heat transfer to a cooling element, which may involve the evaporation of liquid from a cooling collar partially surrounding the container. The container and cooling collar may be subjected to vacuum cooling. The container may include a mechanism to enhance the bulk gas transfer rate during the application of the vacuum while still maintaining the desired atmosphere within the container. The container atmosphere may be precharged with gas of a desired composition. In addition, fumigants may also be included therein. The package is suitable for field packing applications in which the product, such as strawberries, is picked directly into the container surrounded by the cooling collar with the container and cooling collars being placed in an outer box or other receptacle. The modified atmosphere package may be sealed and palletized prior to vacuum cooling.

14 Claims, 9 Drawing Sheets

U.S. PATENT DOCUMENTS

| | | | |
|---|---|---|---|
| 2,786,342 | 3/1957 | Goetz | 62/178 |
| 2,870,954 | 1/1959 | Kulesza | 476/404 |
| 3,111,412 | 11/1963 | Mouk | 426/326 |
| 3,309,206 | 3/1967 | Daniels | 426/109 |
| 3,399,819 | 9/1968 | Rennie et al. | 426/129 |
| 3,450,542 | 6/1969 | Badran | 99/154 |
| 3,453,119 | 7/1969 | McGill | 426/320 |
| 3,507,667 | 4/1970 | Magnen | 99/171 |
| 3,521,806 | 7/1970 | Esty | 229/14 |
| 3,706,410 | 12/1972 | Baker | 229/16 |
| 3,761,289 | 9/1973 | Wolf | 99/171 |
| 3,795,749 | 3/1974 | Cummin et al. | 426/316 |
| 3,804,961 | 4/1974 | Cummin et al. | 426/415 |
| 3,940,062 | 2/1976 | Rainey | 239/56 |
| 3,958,028 | 5/1976 | Burg | 239/56 |
| 4,001,443 | 1/1977 | Dave | 426/106 |
| 4,061,785 | 12/1977 | Nishino | 426/124 |
| 4,163,070 | 7/1979 | Williams | 426/415 |
| 4,204,408 | 5/1980 | Dawson | 62/62 |
| 4,256,770 | 3/1981 | Rainey | 426/124 |
| 4,411,918 | 10/1983 | Cimino et al. | 426/124 |
| 4,515,266 | 5/1985 | Myers | 206/205 |
| 4,734,324 | 3/1988 | Hill | 428/317 |
| 4,903,493 | 2/1990 | Van Iperen et al. | 206/524.4 |
| 4,910,032 | 3/1990 | Antoon, Jr. | 426/118 |
| 4,943,440 | 7/1990 | Armstrong | 426/392 |
| 5,088,293 | 2/1992 | Itou | 62/100 |

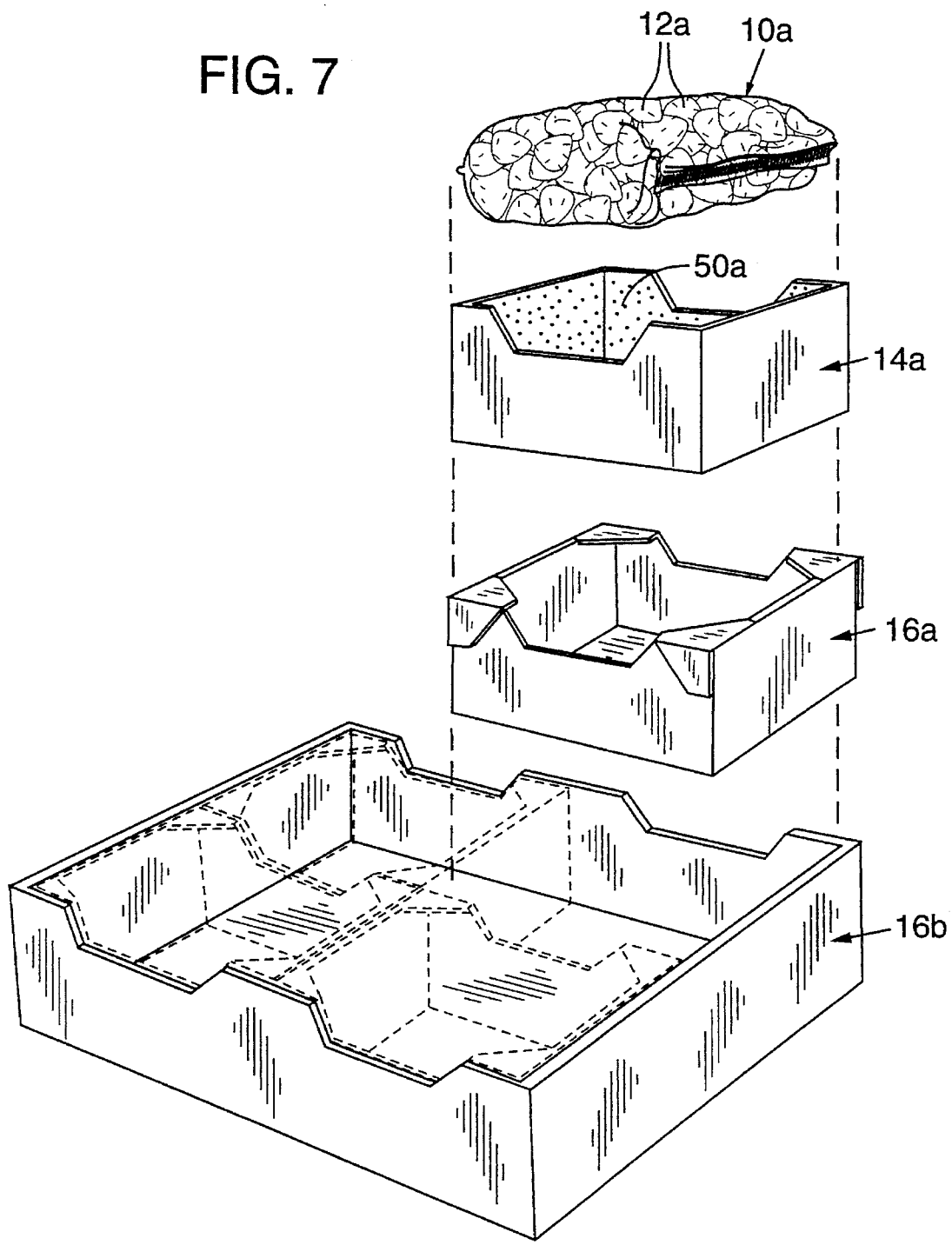

METHOD OF PACKAGING PERISHABLE FOOD OR HORTICULTURAL PRODUCTS

CROSS REFERENCE TO RELATED APPLICATION

This application is a continuation-in-part of patent application Ser. No. 07/577,990, U.S. Pat. No. 5,458,899, filed Sep. 5, 1990, to Floyd et al. and entitled "A Method of Packaging Perishable Food or Horticultural Products".

BACKGROUND OF THE INVENTION

The present invention relates to a method of packaging products and for cooling the packaged products. The method is particularly useful in the packaging and cooling of horticultural products and in field packaging of such products.

Several methods are commonly used for cooling perishable products where rapid cooling is required. These include hydrocooling, vacuum cooling, icing and forced air refrigeration. For example, the so-called "Desert Water Bag" operates on the principle that the evaporation of water from fabric forming the bag cools the water in the bag.

In the produce field, it is common to pick heads of lettuce and place them in waxed boxes with the box of lettuce then being hosed down with water either before or after the boxes are loaded onto a truck. Although evaporation of water from the lettuce during transportation assists in cooling the lettuce, relatively insignificant amounts of water are absorbed by the waxed boxes and cooling is limited. Transportation of broccoli in waxed boxes filled with ice is also known.

In addition, vacuum cooling approaches have been used for cooling produce. In accordance with this cooling technique, the warm product is loaded into an air tight chamber or tube which is subsequently evacuated by a mechanical or steam-ejector vacuum pump to establish a partial vacuum therein. As the total gas pressure in the tube is reduced below the saturation pressure of water at the temperature of the warm product (the "flash point"), water on and within the product begins to evaporate rapidly. The thermal energy required to provide the heat of vaporization of this water comes predominately from the sensible heat (e.g. "field heat") of the product. As a result, the product temperature begins to fall as rapid evaporation begins. Because vacuum pumps are generally very inefficient movers of condensable gases, such as water vapor, chilled coils are provided within the tube or chamber to condense and thereby remove the liberated water vapor. These coils are chilled usually by evaporation of liquid ammonia within, the ammonia being supplied by a conventional vapor-compression refrigeration unit.

In the absence of air or any other restriction to water vapor movement from the product to the chilled coil, the temperature of the product will in time equilibrate with that of the coil (the coil temperature in fact being commonly used as a control variable in vacuum cooling operations). Under these circumstances, the rate of thermal equilibration is largely determined by product characteristics. In general, products high in readily evaporated moisture content, with high thermal conductivity and high evaporative surface-to-volume ratio, will cool more rapidly under vacuum than do other types of products. For example, lettuce and other leafy vegetables cool well under vacuum (high moisture content and high surface-to-volume ratio), while melons do not (low evaporation rate and low surface-to-volume ratio). In addition, strawberries have not been viewed as suitable for vacuum cooling because of damage to the surface of the berries under vacuum conditions and the relatively small rise in cooling rate resulting from the vacuum conditions as opposed to nonvacuum refrigeration type cooling.

One example of a prior art vacuum cooling system is described in U.S. Pat. No. 4,576,014 to Miller, et al. In these approaches, water has been known to be added to the produce by sprinkling the produce before or while the vacuum is imposed to reduce the amount of moisture removed from the produce during cooling with the water evaporated during cooling being supplied at least in part by the water added to the system instead of entirely by the produce. In these approaches known to the inventor, the vacuum cooled produce sprinkled with water has been packed in waxed boxes which absorb very small amounts of water. All of these methods are significantly inhibited if product "exposure" is restricted, as when the product is packed in a plastic bag; such is the case where modified atmosphere packaging is used.

Modified or controlled-atmosphere packaging of fresh produce has also been heretofore utilized and offers advantages to virtually all sectors of the industry, from grower-shipper to food service and retail consumers. Benefits include reduced waste due to spoilage, enhanced quality, extended shelf life and greater consumer convenience. The essential feature of the modified-atmosphere approach to packaging is to seal the product in a package that restricts, to a predetermined degree, the exchange of gases between the product and the surroundings. Many studies have been performed on the desired gas environments for various types of products.

In general, modified-atmosphere packaging retards the four major causes of produce quality loss, namely dehydration, respiration, microbial spoilage and enzyme attack. The quality of cut fruits or vegetables (e.g. florets) deteriorates much more rapidly due to these factors than if the products remain uncut. Moisture loss from produce is governed by Fick's law of diffusion which states that the rate of vapor loss increases in direct proportion to the vapor pressure difference between the surface of the produce and the surrounding air. Since at a constant relative humidity, vapor pressure in the air nearly doubles for each 10° C. temperature rise, and vapor pressure at the surface of fresh produce is nearly 100 percent, produce will dehydrate nearly four times faster at room temperature than at a temperature near freezing, when exposed to "dry" air. A modified-atmosphere packaging with a low moisture permeability will prevent this loss.

All produce continues to respire after harvest. During normal respiration, internal carbohydrates are converted into carbon dioxide, water and energy (heat) according to:

(aerobic respiration): 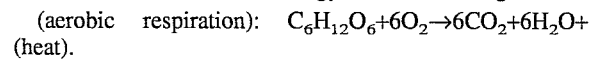 (heat).

This process generally results in a progressive deterioration in product quality. If a harvested item is stored in an oxygen depleted environment, anaerobic respiration occurs. This latter type of respiration is essentially a fermentation process that results in the production of an assortment of organic compounds that lead to undesirable flavors and odors. Anaerobic respiration is described as follows:

(anaerobic respiration): 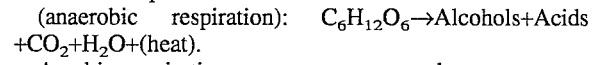

Aerobic respiration rates can vary greatly among commodities, among varieties and even among parts of the same plant. There can be further variability due to growing conditions and post-harvest injuries, such as knife cuts, bruises, chill damage, etc. The most significant factors effecting respiration rate are the stage of maturity of the produce, temperature and storage atmosphere.

The "law of mass action" in chemistry states that the rate of a chemical reaction is proportional to the concentration of each of the reactants. Thus, aerobic respiration can be slowed by either decreasing the oxygen level or increasing the carbon dioxide level of the storage atmosphere. In practice, this relationship appears to hold with the result that increasing the $CO_2$ level is equally as effective as decreasing the $O_2$ level and that the results are additive. Plant sensitivity to $CO_2$ ranges from low tolerance, as with apples, to high tolerance, as with strawberries.

Enzymes are organic catalysts present in abundance in produce. After harvest, these enzymes tend to "spill" from damaged, cut, bruised, etc. cells of produce and can lead to rapid discolorization of light colored surfaces, such as of mushrooms and cut apples. There are two basic ways to combat this enzyme activity. The first is through the reduction of the oxygen level in a package. Enzymatic browning rate tends to vary nearly linearly with oxygen concentration. The second approach is to use enzyme inhibitors. These are components that deactivate the browning enzyme. Sulfite, citric acid and ascorbic acid additives have been used for this purpose. In addition, carbon monoxide in concentrations of one to ten percent is effective as an enzyme inhibiter and as a microbicide. Items known to benefit from small (one to five percent) concentrations of carbon monoxide include cauliflower, avocados, strawberries, tomatoes, cherries and grapes. Items known to benefit from larger concentrations (five to ten percent) include lettuce, stone fruit, melons, cantaloupe, mushrooms and citrus products.

Although bacterial diseases can cause significant decay in vegetables, most post-harvest diseases are caused by fungi. Since these organisms respire in the same manner as the cut plant, their growth in general is controlled by the same factors (e.g. high $CO_2$ concentration, etc.). In addition, microbial decay is dramatically accelerated under high relative humidity conditions. There are a variety of chemical treatments used to control these pathogens, including carbon monoxide and sulfur dioxide. Related to controlling microbial decay of produce, is the control of insects, in particular with respect to exported products which are frequently subjected to quarantine fumigant treatments.

It is also known to inject or charge modified-atmosphere containers with gas of a desired composition for the particular products. This approach has been used, for example, in connection with bread whereby bread is placed in plastic wrappers which are injected with gas of the desired environment prior to sealing the bread in the wrappers. In addition, poultry products are packaged in high $CO_2$ environments and red meat products are packaged in high $O_2$ and $CO_2$ environments.

Because modified-atmosphere packaging inhibits the action of these major causes of product quality loss, it has recently been a focus of much activity. In this regard, there is much data which describes the optimal atmosphere for a variety of commodities. For example, the article entitled "Post-Harvest Technology of Horticultural Crops", by Kader, A et al, special publication 3311, published by the University of California at Davis in 1985, contains a table of optimal storage atmospheres for a wide variety of types of produce. Controlled atmosphere packaging has also been used for bakery, meat and other perishable food products. In general, it appears that one can deviate substantially from an optimal atmosphere and still benefit. Modified-atmosphere packaging is also the subject of numerous patents, such as U.S. Pat. Nos. 4,256,770 to Rainy; 4,515,266 to Myers; and 4,910,032 to Antoon, Jr.

Although these technologies exist, when produce is enclosed in a modified-atmosphere package, it becomes difficult to remove heat, such as heat in the produce and existing at the harvest site or field. In addition to this trapped field heat, the produce continues to warm due to the heat of respiration. As temperature rises, respiration increases exponentially, resulting in heat build up. This situation can readily lead to a loss of product quality that quickly negates the benefits intended with the modified-atmosphere package.

In the prior art, due to the fact that controlled-atmosphere packaging involves the sealing of products in a package that restricts the exchange of gases between the product and surroundings, conventional techniques for field heat removal, such as forced-air cooling and hydrocooling have been applied before the product is sealed in its package and palletized. Because the equipment associated with the cooling techniques is usually located at a central location, the use of modified-atmosphere packaging systems generally requires that the product be shed-packed at a location remote from the picking location, in contradiction to recent trends in agriculture favoring field-packing of many fresh produce items. In addition, if the ready escape of water vapor from the product surface and/or its subsequent flow to a chilled condensing coil are restricted, the rate of cooling under vacuum may be significantly reduced, even in the case of otherwise readily-cooled items, such as lettuce. By their very nature as gas-flow regulating devices, typical modified-atmosphere packages would be expected to inhibit the vacuum cooling process, owing to the severely restricted rates of gas (water vapor) removal from the package.

Thus, the standard modified atmosphere approach for packing berries, such as strawberries, is to pick or harvest the berries into containers; palletize the containers of berries and refrigerate the pallets. After the berries are cooled, the pallets of berries are wrapped in plastic and injected with an enriched $CO_2$ mixture and shipped. When the pallets reach the distributors or end users, the pallets are broken apart and the benefit of the modified atmosphere packaging is lost at that point.

For most modified atmosphere packaged produce other than berries, the produce is harvested and transported to a remote shed for cooling. The cooled produce is cut, processed and sorted. The cooled and now processed produce is then packaged in a modified atmosphere container. This approach is costly and results in damage to the produce due to multiple handling steps and due to the delayed placement of the produce in a modified atmosphere package.

Therefore, a need exists for a new method for overcoming these and other disadvantages of the prior art.

SUMMARY OF THE INVENTION

In accordance with one aspect of the present invention, the method comprises the steps of enclosing the products in a container which controls the flow of gas between the exterior and interior of the container so as to provide a modified gas atmosphere within the container and the step of cooling the container with the enclosed products in an improved manner.

In accordance with the method, and assuming the products or container are of the type containing moisture, the method involves cooling the exterior of the container in an improved manner to condense water vapor within the container against a cooled surface of the container to cool the products therein with water vapor evaporating from products within the container being accelerated, for example by a vacuum, to further enhance the cooling.

Also, in accordance with one aspect of the method, the improved cooling of the exterior of the container step involves positioning the container in thermal communication, and preferably in contact with, a cooling element. The cooling element may comprise a temperature heat sink element in proximity to the exterior of the container for cooling the container. Preferably, the heat sink element is in contact with or adjacent to a major portion of the exterior surface areas of the container. A major portion meaning at least from about thirty to fifty percent of the surface area of the exterior of the container.

The heat sink element may comprise a chilled or frozen element, such as in the form of a collar. A frozen block of liquid, such as ice may be used as the heat sink element. Also, frozen or cooled phase change chemicals, such as potassium nitrate or water in a sealed container, may be used as the heat sink. Vacuum cooling of the package enhances the cooling of the packaged product. Also, the heat sink may itself comprise a cooling element which contains a liquid and which is exposed to the environment outside of the container such that evaporation of liquid from the cooling element enhances the evaporative cooling of the product packed in the container. In this latter case, vacuum cooling of the cooling element enhances the evaporation of the liquid from the cooling element and the cooling of the exterior of the container and of the products packed therein.

In accordance with the method, the cooling step may comprise the step of wetting the exterior of the container with liquid and evaporating liquid from the exterior of container such that the container performs the dual function of a heat sink and a modified atmosphere environment. In this case, the container preferably is of a hydrophilic material or is otherwise designed to hold water. In addition, cooling of the container may be accomplished by evaporating water or other liquid from a wetted cooling element placed in proximity to the container. Again, cooling may also include the step of subjecting the container to a vacuum to accelerate the evaporation of the liquid from the container, and from any liquid containing cooling element in the event such a cooling element is used. This cooling accelerates the evaporation of water vapor from the product and the movement of that vapor to the chilled container wall. The evaporative cooling step may thus include either or both of the above described steps of (a) evaporating liquid from the container or a cooling element; and (b) vacuum cooling of the container and of a cooling element, if used. In addition, the cooling step may include the use of a cooling element or heat sink of the type which does not permit the evaporation of liquid therefrom, either with or without vacuum cooling.

As another aspect of the method, the container may be charged with a gas of a modified atmosphere having a gas balance differing from air and which is selected for enhancing the length of time during which the products within the container are at a peak quality. The charging gas may include a fumigant, an enzyme blocker, or both. The gas may also include an insecticide.

As another aspect of the method, assuming the use of a vacuum, the method includes permitting the bulk transfer of gas from the interior of the container to the exterior of the container during the application of the vacuum.

As yet another step of the present invention, the container may be placed in a receptacle either alone or in conjunction with a cooling element. The cooling element may be integral with the container or the receptacle as well as a self-contained element.

As a still further aspect of the present invention, the container may be expanded against a cooling element during the application of a vacuum to further enhance the cooling as liquid is evaporated from the cooling element.

In connection with a field-packing application of the method, horticultural products such as strawberries may be harvested in the field directly into a container of the type which controls the flow of gas between the exterior and interior of the container. The container may be cooled at the harvest site by placing the cooling element heat sink in proximity to or in contact with the container. The container may also be evaporatively cooled at the harvest site, as by evaporating liquid from a liquid containing cooling element in proximity to the container so as to lower the temperature of the container as the products are being harvested into the container. The containers and cooling elements may be in a receptacle as the produce is harvested, the receptacle being of the type, for example, suitable for display in a retail establishment. The containers may be sealed in the field with the sealed containers being thereafter subjected to a vacuum, either at the harvest site or at some remote location, with the bulk transfer of gas being permitted from the interior to the exterior of the container during the vacuum applying step.

In accordance with the method, the container may at least in part be of a heat sealable material with heat being utilized to seal the container for purposes of establishing or maintaining a modified atmosphere therein. A mechanical sealing step may be included instead of, or in addition to, the heat sealing step. When mechanical sealing is utilized as an auxiliary seal, the containers are typically mechanically sealed to facilitate orientation of the containers for a subsequent heat sealing step.

Assuming the products contain water vapor, under these conditions water vapor will evaporate from the products within the container and condense against the cooled container, to thereby enhance the cooling of the products. This cooling is aided by the cooling resulting from the cooling element in proximity to the container. This cooling may also be aided by the evaporation of liquid at the exterior of the container, for example from the cooling element if a liquid evaporative type of cooling element is used. In this latter case of an evaporative type cooling element, the method involves a three-step cooling approach. That is, first, evaporative cooling takes place as the produce is harvested due to evaporation of liquid from a cooling element or from the container in the event the container serves the function of the cooling element. Heat is removed by conduction to the cooling element. Secondly, enhanced evaporative cooling results from the application of a vacuum which causes both an accelerated evaporation of liquid from the cooling element and the evaporation of water from the produce. In addition, heat is removed by conduction through the container. Thirdly, post-vacuum cooling takes place as a result of further evaporation of liquid from the cooling element and conduction of heat through the container to the cooling element. In the event the cooling element is not in contact with the container, convective cooling also occurs.

As another aspect of the method, the evaporative form of cooling element is typically saturated with at least about forty-five to about sixty-five grams of liquid per each kilogram of product within the container. When liquid in this amount is included during the vacuum applying step, the temperature of the cooling element typically drops to a much lower temperature than the temperature of the product within the container. As a result, there is further acceleration of heat transfer away from the product to the cooling element following the application of the vacuum.

It is accordingly one object of the present invention to provide an improved method for packaging and cooling perishable food and horticultural products.

Another object of the present invention is to provide a method usable in field applications by which a field-packed modified-atmosphere or other wrapped container may still be effectively cooled, including cooling under vacuum conditions.

Still another object of the present invention is to provide a method which is capable of enhancing the effectiveness of cooling of a wide variety of products, including strawberries and in which vacuum cooling may be utilized to enhance the cooling process.

Another object of the present invention is to provide a method which extends the duration of the peak quality of a product for eating or other use. This allows the picking of produce when the produce is closer to full maturity, an expansion of marketing opportunities in that products may be economically shipped to more distant markets, and an extension of the marketing season in that seasonal products may be held longer and still be at a high quality when sold.

As another object of the present invention, efficiencies in processing the products are enhanced and costs are reduced. For example, waste (e.g. lettuce cores, broccoli stalks) can be removed and left in the field so that the product arrives ready to eat without additional processing being required. This reduces waste disposal costs and labor costs at the point of sale. In addition, losses due to spoilage of the products are reduced. Moreover, transportation costs are reduced as much of the relatively heavy ice used in the transportation of many types of products, such as broccoli, can be eliminated.

As another object of the present invention, loads of various products not otherwise typically shipped together, may be commingled. For example, ethylene sensitive products, such as bananas, or odor absorbing products, such as strawberries, can be shipped with odor emitting products such as onions or ethylene emitting products, such as apples, pears and tomatoes.

As another object of the present invention, the products may be packaged and labeled in the field to minimize the possibility of misbranding of the products downstream in the distribution chain.

As an advantage of the method of the present invention, the room temperature tolerance of the products is increased and the duration of peak quality of such products is improved, even under such adverse conditions.

As yet another object of the present invention, a method is provided which minimizes the possibility of cross-contamination of products, for example the possibility of pests found in some products migrating to other products during shipment.

The present invention relates to the above features, objects and advantages individually and collectively. These and other objects, features and advantages of the present invention will become apparent with reference to the following description and drawings.

BRIEF DESCRIPTION OF THE DRAWINGS

FIG. 7 is an exploded view of an alternative form of container usable in a method in accordance with the present invention.

DETAILED DESCRIPTION OF PREFERRED EMBODIMENTS

The package, packaging system, and method of the present invention is applicable to the packaging of a wide variety of perishable food and horticultural products. These products include both respiring and nonrespiring types. Respiring products include, but are not limited to, cut and uncut fruits and vegetables and other horticultural products such as cut flowers. Nonrespiring products include, but are not limited to, bakery products, meats, poultry and fish. Although the invention has wide applicability to the packaging of perishable food and horticultural products in general, the invention offers particular advantages in conjunction with packaging and cooling products, including those products benefited by a modified atmosphere environment.

For purposes of convenience, and not to be construed as a limitation, the invention will be described in an application involving the harvesting and packaging of strawberries (a respiring product) and in which a modified atmosphere environment is utilized.

Figure 1:
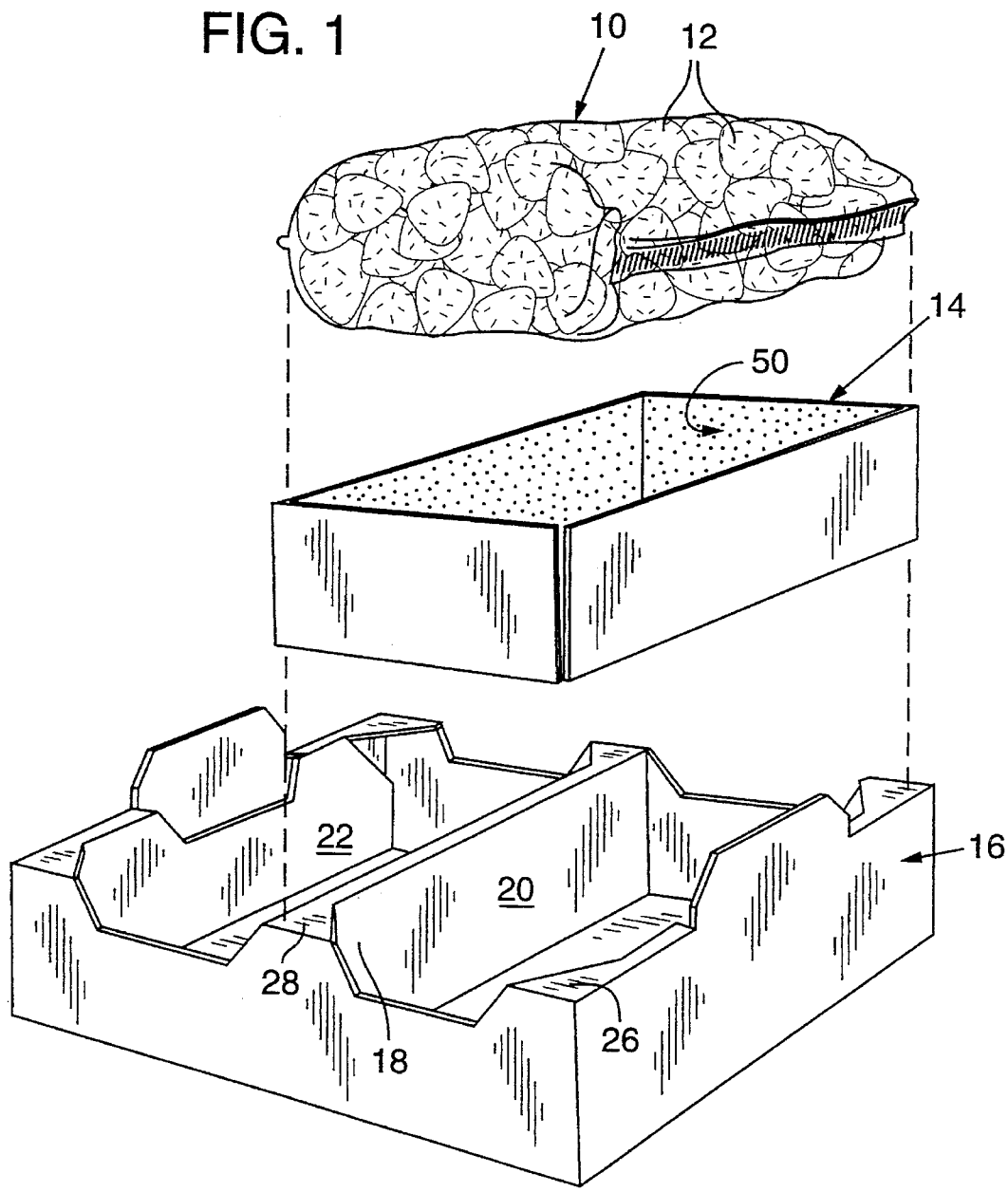
FIG. 1 is an exploded view of one form of package usable in a method in accordance with the present invention illustrating a produce container, a cooling element and receptacle.

With reference to FIG. 1, the illustrated package includes a modified atmosphere container 10 enclosing strawberries 12 therein, a cooling element in the form of a cooling collar 14 within which the container 10 is positioned when the packaged is assembled, and a box-like receptacle 16 for receiving both the cooling collar and container. The illustrated receptacle 16 is subdivided by a wall 18 into a first compartment 20 and a second compartment 22. Although only one cooling collar 14 and container 10 is shown in FIG. 1, plural such elements are typically provided with one container and collar being positioned in compartment 20 and another such container and collar being positioned in compartment 22. As explained below, the receptacle 16 is typically of a corrugated kraft board material assembled to provide reinforced corners and the central wall, with upper planar shelves, some being numbered as 26, 28, to facilitate stacking of product containing receptacles on top of one another.

The container has a produce containing interior and an exterior and is preferably of the type which is closable with product to provide a controlled flow of gas between the interior and exterior of the container when closed. The material used for the container is selected to provide a desirable gas environment for the particular product being contained. Suitable environments and storage conditions are found in the literature, for example in the previously mentioned article by Kader, A. et al. entitled "Post Harvest Technology of Horticultural Crops." The Kader article mentions that a desirable environment for broccoli is one to two percent $O_2$ and five to ten percent $CO_2$, and that a desired environment for strawberries is ten percent $O_2$ and fifteen to twenty percent $CO_2$.

Most gases will dissolve in plastic films. Once dissolved, the gases diffuse through the film and eventually evaporate from the opposite surface. With films, this process has been shown to follow an "Arrehenius" relationship, whereby their permeability increases with temperature. For most non-gas-barrier films, this temperature change amounts to approximately doubling the permeability when the temperature rises from freezing to room temperature. The permeability of a plastic film can be increased with the addition of plasticizers. Water vapor is a strong plasticizing agent for hydrophilic polymers, such as cellophane, nylon and ethylene vinyl alcohol; thus, permeabilities of these films tend to be highly dependent upon relative humidity. Permeability is somewhat different for each gas depending upon its solubility and molecular size. Permeability ratios, however, are remarkably constant across a broad spectrum of polymers. As a rule of thumb, $O_2$ and nitrogen permeabilities through film are four and eight times lower than carbon dioxide, respectively. Each gas diffuses independent of the others in the mix so that the transfer of a single gas through a film or membrane is dependent on its partial pressure drop across the membrane.

Gas permeability of plastic films is measured in accordance with ASTM Standard D1434, commonly referred to as the Dow cell Method. The water vapor transmission rate of plastic films is generally measured in accordance with ASTM Standard E96. Typical permeance and water vapor transmission data for plastic films can be obtained from the suppliers of these films with one needing only to select a film that provides the desired environment. In general, the higher the water vapor transmission rate, the lower the gas permeance of a film. Typical film permeance properties of a number of films are set forth in the table below.

TABLE I

| Film | Permeance[1] | | | WVTR[2] |
| --- | --- | --- | --- | --- |
| | $CO_2$ | $O_2$ | $N_2$ | |
| Polyethylene (low density) | 1,500 | 270 | 100 | <1 |
| Polypropylene | 350 | 100 | 25 | <1 |
| Silicone | 350,000 | 70,000 | 30,000 | <1 |
| Cellophane | <1 | <1 | <1 | 75 |
| Nylon | 5 | 2 | <1 | 10 |
| Polycarbonate | 550 | 150 | 25 | 6 |
| Styrene | 500 | 150 | 30 | 5 |
| PVC | 5,600 | 550 | 225 | 25 |

[1] mL/hr - atm - m² (1 mm thickness, room temperature)
[2] gm/m²/day (1 mm thickness, 95% RH, room temperature)

For products which are not sensitive to the presence of water, such as broccoli, a film container of a material such as polyethylene may be selected. However, for packaging products which are sensitive to relative humidity and the presence of water, for example fruit and sugar containing produce such as apples and strawberries, a material with a higher water vapor transmission rate, such as cellophane is preferred. However, a container entirely of cellophane or of another gas barrier film, as is apparent from the above table, would in most cases not provide the desired controlled atmosphere environment in the container for respiring type products as cellophane tends to be a gas-barrier to carbon dioxide, oxygen and nitrogen.

It should also be noted that for nonrespiring products, barrier type films are preferred with the containers being charged with desired mixes of gases during packaging.

A number of options exist for providing a container with a modified atmosphere environment and which allows the escape of water vapor. In one basic approach, the container may be made of more than one material, one of the materials permitting the passage of water vapor and the other material controlling diffusion of gases. This approach, which may be called a window technique, may be accomplished by, for example, the inclusion of a section or patch of porous or nonporous material in the container, the patch being of the type which controls the desired diffusion of gas between the interior and exterior of the container. Another approach, as explained below, is to include one or more apertures in the container which are sized to control the diffusion of gases through the aperture. As explained below, the use of a patch of porous material or an apertured container is helpful in vacuum cooling applications as the apertures and porous material facilitate the bulk transfer of gas from the container when the container is subjected to a vacuum.

In connection with the window approach, one container material may be relatively water permeable and a gas barrier, such as cellophane or ethylene vinyl alcohol copolymers. Another container material may be a nonporous material selected to control the gas transfer by diffusion between the interior and exterior of the container so as to establish the desired controlled atmosphere environment. One approach for accomplishing this result is to make the container 10 in the form of a bag, a portion of which is indicated at 30 in FIG. 4, of a water vapor permeable gas barrier material with an aperture 32 being provided in the bag. The aperture is covered with a patch 34 having a permeance which establishes the desired gas environment within the container. For example, the patch 34 may be of silicone such that gas diffuses through the patch until the oxygen and carbon dioxide concentrations reach the desired relative levels within the container. If the product is respiring, equilibrium levels in the container will differ from air in that the oxygen concentration is reduced and the carbon dioxide concentration is increased. Yet, the overall bag material 30 permits the removal of water and water vapor through this portion of the container. As another option for removing excess water from within the container, desiccants, such as in the form of one or more package inserts, may be included within the container.

Referring again to FIG. 4, the patch 34 is typically sealed, as by an adhesive 36 (or mechanically, or heat sealed, or otherwise sealed) to the container to close the aperture 32. As shown in FIG. 5a, the adhesive 36 is typically placed so as to form a perimeter seal at a location spaced from the boundary of the aperture 32 for purposes explained below.

Another window approach involves the use of a porous patch for the window. These porous membranes control the bulk diffusion of gas between the interior and exterior of the container so as to control the atmosphere within the container as desired. Examples of suitable porous patch materials and the measured gas transfer coefficients through apertures of selected dimensions covered with a number of such porous materials are indicated in Table II below.

TABLE II

| Membrane | Condition | Test Diameter (cm) | (ML/hr-atm) |
|---|---|---|---|
| Nuclepore (3 micron) | Dry | 0.69 | 695 |
| | Wet | 0.69 | 650 |
| Veratec 58.1# Polyester | Dry | 1.0 | 1,120 |
| | Wet | 1.0 | 880 |
| 42# Bleached Liner | Dry | 1.0 | 155 |
| | Wet | 1.0 | 265 |
| 33# Kraft Liner | Dry | 1.0 | 500 |
| | Wet | 1.0 | 480 |
| Teslin Synthetic | Dry | 1.0 | 655 |
| Paper (PPG) (10 mil) | Wet | 1.0 | 480 |
| Tyvek #1059B | Dry | 5* | 7,580 |

*Large diameter required due to material nonuniformity.

Figure 6:
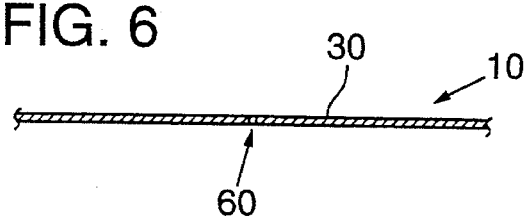
FIG. 6 is a cross-sectional view of a portion of a container which illustrates an alternative bulk gas transfer mechanism.

Yet another way of achieving the desired modified atmosphere environment within the container 10 has been discovered. With reference to FIG. 6, perforating the container 10 with a small aperture or hole 60 has been found to work effectively in these applications.

Figure 13:
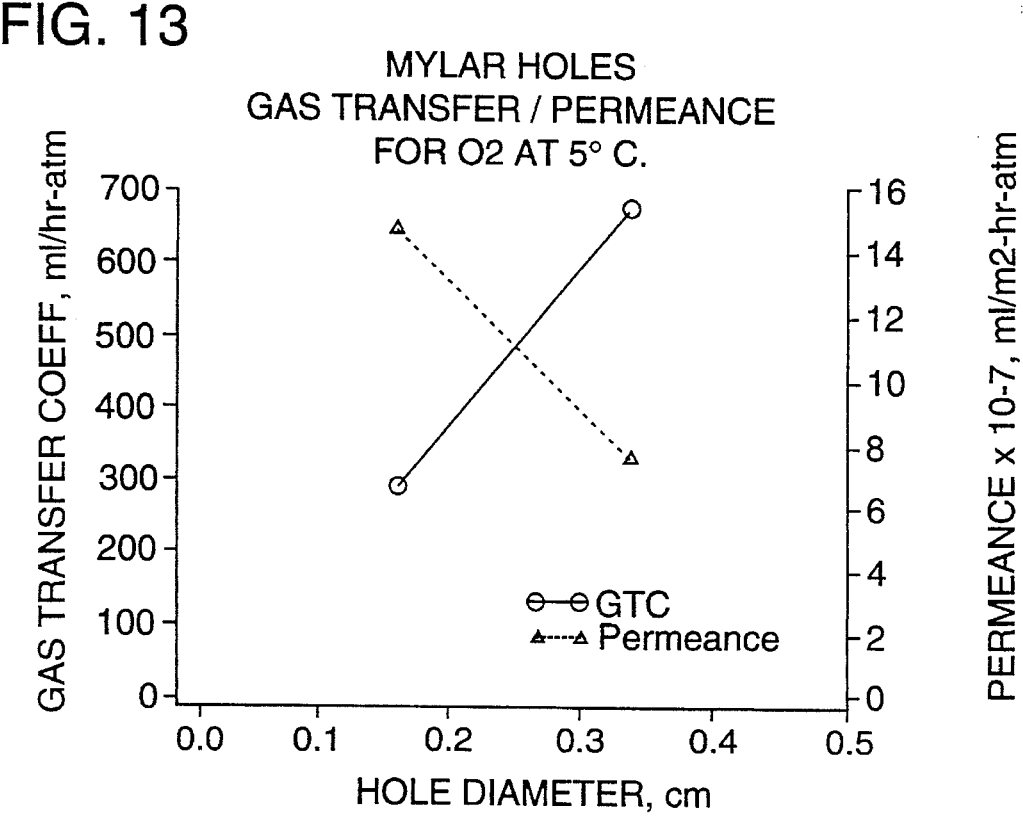
FIGS. 13–15 are graphs illustrating the gas transfer and permeance characteristics of selected types of media suitable for use in containers used in the method of the present invention.
Figure 14:
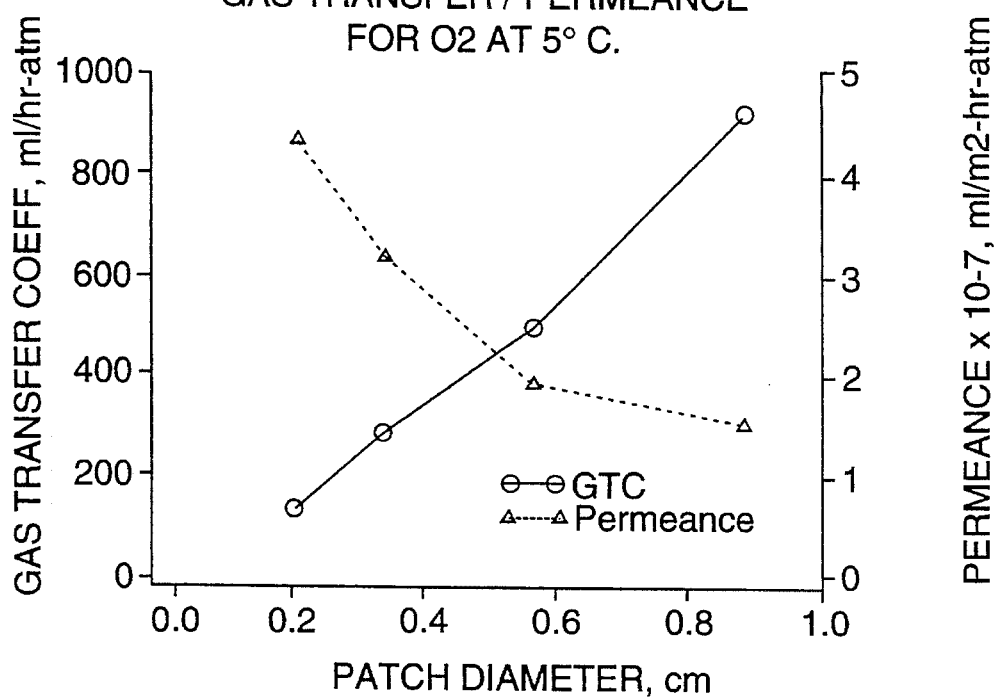
Figure 15:
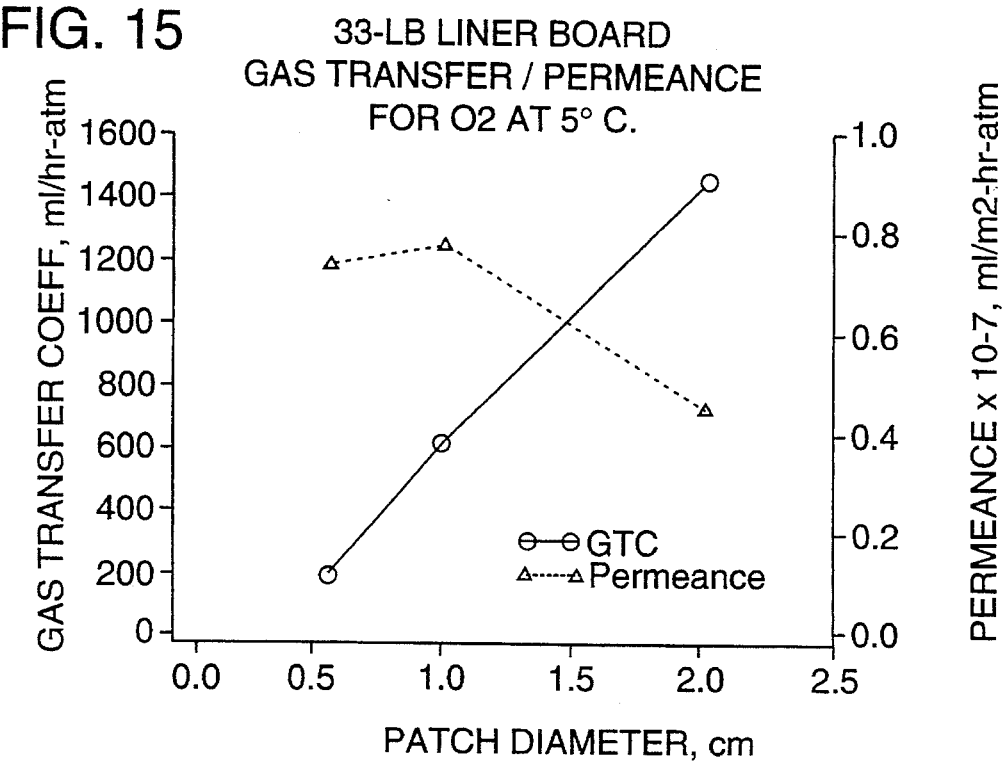

Ordinary molecular diffusion occurs through perforated or porous membranes whose pore diameters are large relative to the mean free path of the gas. For atmospheric gases, relatively large pores refers to pore sizes larger than about 0.5 microns in diameter. Although ordinary molecular diffusion increases with absolute temperature to the 1.75 power, there is little temperature dependence over the relatively small range of interest to modified atmosphere packaging. There is, however, a slight dependence on gas composition, since $O_2$ and $N_2$ diffuse approximately thirty percent more readily than $CO_2$ and $H_2O$ vapor diffuses approximately sixty percent more readily than $CO_2$. However, it has been found that the gas transfer coefficient increases proportionately with the circumference of an aperture rather than the area of the aperture. FIGS. 13, 14 and 15 illustrate these observations for three different types of materials. This finding has provided a basis for selecting aperture sizes which result in the desired gas environment while still permitting the enhanced bulk transfer of gas under vacuum conditions. Apertures having an area of that of a circle of a diameter of from about twenty-five microns to about six hundred and fifty microns per kilogram of packed product have proven to maintain the desired controlled atmosphere with packages having in the range of up to about one-half to ten kilograms of packed product having been tested to date.

Another gas transfer mechanism is Knudsen diffusion through porous membranes whose pore diameters are small relative to the mean free path of the gas. For atmospheric gases, this means pores smaller than about 0.5 microns in diameter. In Knudsen diffusion, gas permeance is related to the inverse of the molecular weight of the gas. Thus, theoretically, Knudsen diffusion will result in oxygen and nitrogen permeabilities twenty percent and thirty percent higher than carbon dioxide, respectively.

It is also possible to further modify the internal atmosphere of a modified atmosphere container using an assortment of gas scrubbing materials. Scrubbing products are commercially available for ethylene, carbon dioxide, oxygen and water vapor. In particular, silica gel and clay are commonly used to scrub water vapor, iron oxide is commonly used to scrub oxygen, lime is commonly used to scrub carbon dioxide, and potassium permanganate is commonly used to scrub ethylene from the controlled atmosphere environment. In addition, humectants are sometimes used to control the humidity in a controlled atmosphere container.

Designing a modified atmosphere package simply involves throttling the incoming oxygen and outgoing carbon dioxide streams so that respiring produce becomes starved for oxygen and flooded with carbon dioxide. At a steady state, in general, all of the oxygen being consumed by the respiring produce must pass through the package. This oxygen will pass through at a rate dependent upon the gas transmission rate of the film and the partial pressure drop across it. Thus, when respiring produce is packed in a controlled atmosphere package, the oxygen level will continue to drop and the carbon dioxide and water vapor levels will continue to rise until the respiration rate is in balance with the gas transfer rate of the film.

As previously mentioned, most plastic films are more permeable to carbon dioxide than they are to oxygen. In addition, respiring produce consumes approximately the same volume of oxygen as the volume of carbon dioxide it emits. Because of these properties, produce in a sealed plastic film container will reach a stable atmosphere in which the oxygen deficit is higher than the carbon dioxide buildup. As shown in Table I, permeance ratios ($CO_2$:$O_2$) for "commodity" film materials range from about three to one (styrene) to ten to one (polyvinyl chloride). With a sealed polystyrene wrap, it is thus possible to achieve any atmosphere along the line AD of FIG. 16. Similarly, with a PVC wrap, one can achieve any atmosphere along AB. Thus, using the sealed commodity films listed in Table I, it is possible to achieve any atmosphere within the triangle ABD of FIG. 16. With other materials, the area within the triangle may be varied.

Figure 16:
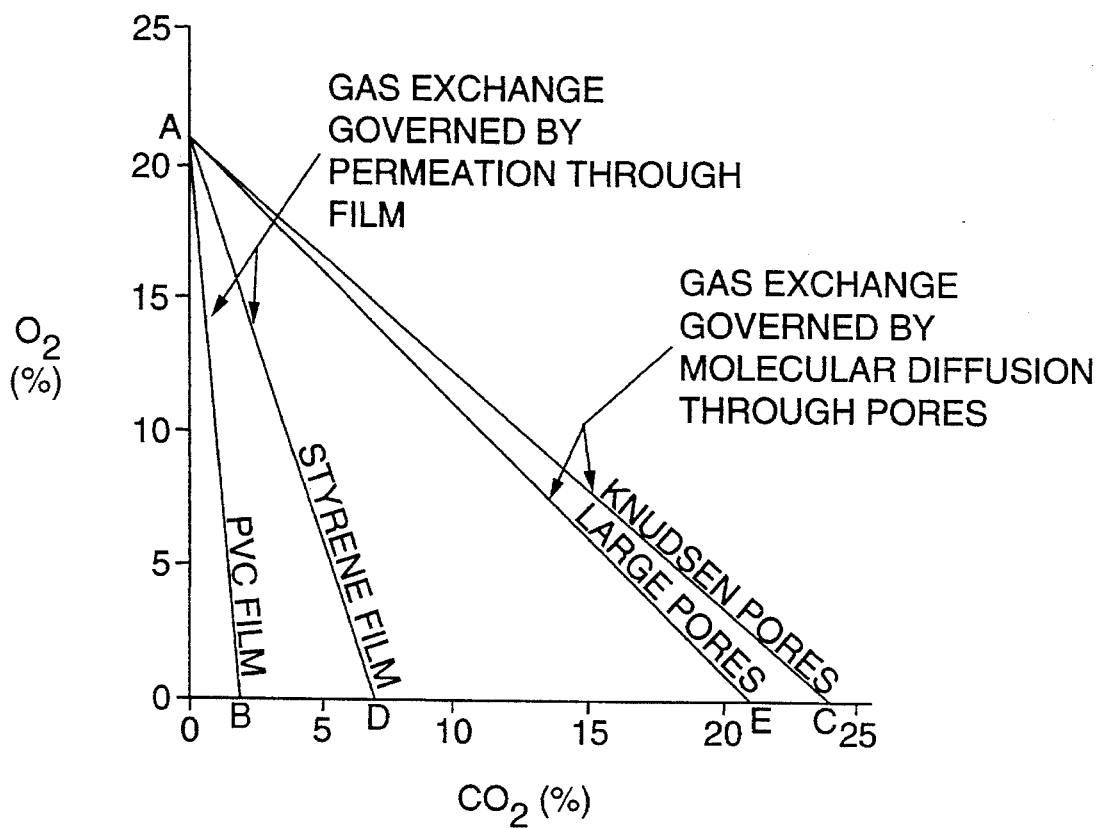
FIG. 16 is a graph illustrating oxygen and carbon dioxide concentrations achievable in containers of various constructions.

Within the ABD range of FIG. 16, the carbon dioxide and oxygen levels do not add to twenty-one percent. This means that a partial vacuum is created within the package. As a result, any "pin hole" leak in such a package will result in nitrogen enrichment to make up the pressure difference. This in effect provides the basis for a slight enlargement of the design range by using perforated barrier wraps. As previously discussed, if the perforations are large (relative to 0.5 microns), bulk diffusion dominates so that it is possible to achieve a further enlargement to line AE in FIG. 16. Similarly, if the perforations are small (relative to 0.5 microns), Knudsen diffusion dominates so that it is possible to achieve any internal atmosphere along line AC.

By combining these mechanisms, (e.g. perforating a gas permeable film) one can obtain any atmosphere within the triangle ABC of FIG. 16.

Thus, a mechanism is described for readily selecting materials for obtaining a desired controlled atmosphere environment for a wide variety of products.

By circumventing the inherent restrictions placed on the outward water vapor flow by modified-atmosphere packages, effective cooling of products sealed in such packages is permitted. This cooling is accomplished by locating a heat sink or cooling element in proximity to the outside wall of the container 10. The heat sink is in close enough proximity to the outside wall so as to facilitate heat transfer between the exterior of the container and the heat sink. Most preferably the heat sink is in direct contact with such outside wall of the container. It is also preferred that the heat sink contact is proximate to a major portion of the surface area of the container. A major portion means for purposes of this description at least from about thirty to about fifty percent of the exterior container wall surface area.

To facilitate use of the invention in the field, it is preferred that the package, including the cooling element, be of a size and weight which makes them easily manually portable. Consequently, harvesters can carry these packages with them as they move about a field and harvest products. Typically, the receptacles, containers, cooling elements and packed produce in a package of the present invention weighs less than fifty pounds to facilitate manual carrying of the packages.

Figure 17:
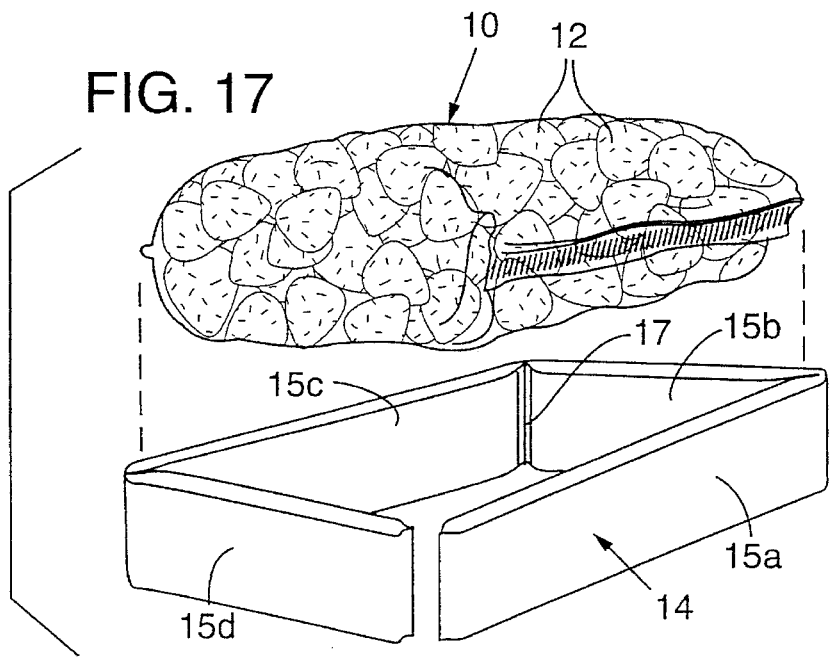
FIG. 17 is an exploded view of a container and another form of cooling element in accordance with the present invention.

The cooling element may take many forms to provide the desired heat sink at the exterior of the container. As shown in FIG. 17, the cooling element may comprise a collar 14b, such as of a liquid impermeable plastic film (e.g. polyethylene) which seals a liquid therein, such as water or a phase change cooling chemical, with potassium nitrate being one example. The illustrated collar 14b has plural liquid containing compartments 15a, 15b, 15c and 15d which are joined together by hinge forming portions, such as indicated at 17. The components may be formed, for example, by sealing the outer pouch forming cover material together at the hinge locations, to separate the collar 14b into individual cooling material containing compartments.

The collar 14b is typically frozen and placed in a receptacle 16 with the container 10 opened and positioned within the collar in the field. Produce is harvested into the container. When full the container is full, the container is closed, as explained below, for example in the field. The collar 14b acts as a heat sink to cool the exterior wall of the container and the packed product, which may then subsequently be vacuum cooled to substantially accelerate the cooling such as explained by way of example in conjunction with Table III below. The collar 14b may be removed prior to shipment of the cooled produce and refrozen for subsequent reuse in the field harvesting operation. Other forms of heat sinks or cooling elements may also be used, provided the heat sink offers a sufficient thermal mass to accomplish the desired cooling. Preferably the thermal mass is such that it is capable of dropping the temperature of packed produce in the field under normal field temperatures and container filling times from about 80° F. to about 35° F. In general, it is preferred that the thermal mass be capable of one BTU (British Thermal Unit) per pound of packed product in the container per degree of cooling desired. Thus, for a temperature drop of from 80° F. to about 35° F., the thermal capacity of the collar preferably is at least about 45 BTU per pound of packed product. By providing excess thermal capacity (e.g. another 5 BTU per pound of packed product), the cooling collar also compensates somewhat for the time the container is exposed to field temperatures as the container is being filled.

The cooling element may also be of the type which permits the evaporation of liquid therefrom to provide the heat sink in this manner. Evaporation of a cooling liquid in proximity to the exterior wall of the container 10 cools the contents of the container by evaporation and transfer of heat from the products in the container through the container wall. Water vapor within the package, for example, from moisture containing products, tends to condense on the chilled inner surface of the package wall (which is also true when other types of cooling elements are used), reducing the water vapor pressure inside the package and promoting further evaporation of water from the moist product. This evaporation from both the cooling element and packed product is enhanced under vacuum conditions and results in a rapid cooling of the product. Thus, cooling, and in particular a vacuum cooling approach can be applied to the product within a modified-atmosphere package. Cooling is accomplished by a series evaporation-condensation-evaporation process that is facilitated by the moisture source in proximity to or contact with the exterior container wall.

Figure 3:
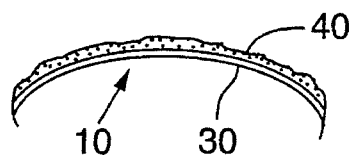
FIG. 3 is cross-sectional view of a portion of an alternative form of container in which the container and cooling element are combined.

Although FIG. 1 illustrates one form of a separate cooling element which is capable of holding a volatile liquid, such as water, ethanol or the like, against the container wall, other approaches may be used. For example, by making the container of a hydrophilic material, such as of a cellulose based material (e.g. nylon, cellulose acetate, cellophane or other dissolved cellulose based films) or other absorbent material, the container 10 itself may function as a cooling element with liquid evaporating from the container to facilitate the cooling of its contents. Polysaccharide films, hydrogels (such as the so-called superabsorbent particles common in the disposable diaper art) adhered to film, fibrous materials such as wood pulp adhered to the film, water pouches or pockets on the container, are yet other examples of mechanisms for incorporating liquid into the container for purposes of evaporative cooling. For example, FIG. 3 illustrates a film 30 with adhered wood pulp particles 40, the wood pulp particles holding water for use in evaporative cooling of the contents of the container.

The required capacity of the moisture source, whether it be a substrate on the container 10 or moisture holding substrate in a separate cooling element such as collar 14, depends upon the mass of the product within the package. With water being the cooling liquid, a rule of thumb indicates that one percent of the product mass is lost to evaporation for every 10° F. of vacuum cooling. To minimize evaporation of moisture from the product itself during cooling, the moisture source is typically designed to provide at least this minimum mass. In a typical field packing operation, one can assume an average air temperature of about 80° F. Therefore, to drop the temperature of products from 80° F. to 35° F. would require about forty-five grams of water for each kilogram of product in the container. However, in accordance with the method of the present invention, and to gain benefits of cooling during harvesting of the produce, water is typically added to the cooling element or package in advance of harvesting the produce such that the produce is harvested into a container already provided with this added moisture. Because evaporation can take place, and is encouraged for cooling purposes, during actual picking of the strawberries or other products, excess water is typically included so that enough water remains in the container for purposes of subsequent evaporative cooling, such as under vacuum conditions. Therefore, a preferable cooling container is designed to hold an excess amount of water, such as about sixty-five grams of water for each kilogram of product in the container. Also, in general, the greater the proportion of the container in contact with the moisture source, the more effective the cooling. In addition, relatively thin moisture containing substrates offer a low resistance to the transfer of heat from the condensing surface at the interior of the container to the evaporating moisture in the substrate and thereby increase cooling effectiveness.

To accommodate this relatively large quantity of moisture, the moisture is most conveniently placed in a substrate with the substrate being positioned in contact with the container wall. Also, by utilizing a container 10 of a flexible material, the container expands against the substrate during the application of a vacuum. This advantage is also obtained by using a flexible container with the other forms of cooling elements. This is due to the delay in evacuating the air from the container and the fact that the container tends to inflate against the cooling element, thereby enhancing the contact between these components and enhancing the resulting heat transfer.

Any moisture absorbing material may be utilized, such as blotter pads, absorbent fluff pulp, superabsorbent polymers, paper, molded fiber and combinations thereof. The location of the moisture containing substrate with respect to the container 10 may be varied, such as underneath, along side, or on top of the container.

Figure 2:
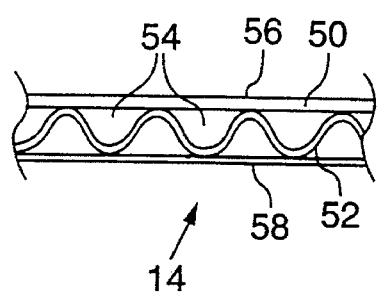
FIG. 2 is a cross-sectional view of a portion of one form of cooling element in accordance with the package used in the method in accordance with the present invention also showing a portion of an alternative form of receptacle in the event the cooling element and receptacle are combined.

In the design of a cooling element such as collar 14 shown in FIG. 1, the substrate material is indicated at 50 and positioned at the interior of the collar 14. In FIG. 2, the water containing substrate 50 comprises a sheet which is positioned at a surface of the collar 14 and which is incorporated into the collar. Again, the sheet may be of any suitable liquid containing material, such as wood pulp. Also as shown in FIG. 2, the collar 14 may include a conventional corrugated core, indicated at 52, such as of corrugated Kraft paper. The corrugations define passageways or flutes, some being indicated at 54 in FIG. 2, which permit the passage of air or otherwise expose the back side of the sheet 50. Consequently, evaporation of liquid from the back side of the sheet is enhanced. This can be important, especially if the container is pressing against the exposed surface 56 of the sheet so as to limit evaporation at the area of contact between the container and sheet. To limit the possible transmission of liquid to an exterior sheet 58 of the collar 14, the core 52 may be formed of a water resistant or water impermeable material. Wax impregnated medium, such as a waxed paper, is one specific example of a medium which may be utilized for this purpose. Although migration of liquid through the liner and the core 52 to the sheet 58 is typically limited in any event, the use of a water resistant core 52 minimizes the potential wetting of the sheet 58.

The receptacle 16 may be a separate element as indicated at FIG. 1, or may be combined with the cooling element 14. One convenient approach for combining these elements is to utilize the structure of FIG. 2 for the receptacle, in which case the interior surface of the receptacle comprises the water holding or carrying material, such as the sheet 50. Also, with a water resistant core 52, the sheet 58 remains substantially dry. Therefore, the sheet 52 may be preprinted with brand identification or other advertising material so that the receptacle 16 is usable as the display container for the produce, such as in a retail establishment. Of course, a separate receptacle 16 may also be used for this purpose. With the optional construction utilizing a water resistant core 52, the receptacle 16 remains strong enough for stacking and carrying the products as well as for protecting the products during shipment even though the sheet 50 is wet.

In applications wherein the package is to be vacuum cooled, cooling is greatly assisted if a path is provided for removal of air from the inside of the package during the evacuation period. Otherwise the pressure of air within the package inhibits the condensation of water vapor from the product onto the cold package wall. One way of providing the pathway is to utilize the small window or patch of porous filtration material which allows the bulk transfer of air from within the container during the application of the vacuum while still permitting diffusion to control the gas balance within the container during storage. However, to increase the gas transfer rate during evaporative cooling, mechanical valves, such as the valve described in U.S. Pat. No. 4,890, 637 or the like, may be included in the wall of the container 10. Although suitable, mechanical valves tend to add to the expense of the packaging system.

Figure 4:
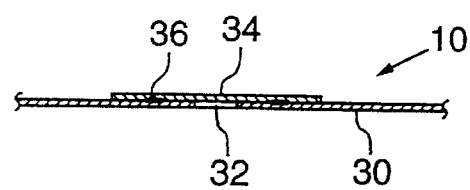
FIG. 4 is cross-sectional illustration of one form of mechanism for increasing the bulk flow of gas from the interior to the exterior of the container when the container is subjected to a vacuum.
Figure 5:
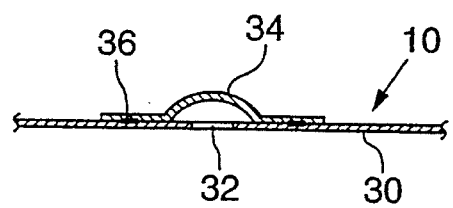
FIG. 5 is an illustration similar to FIG. 4 showing the operation of the bulk gas transfer mechanism when subjected to a vacuum.
Figure 5A:
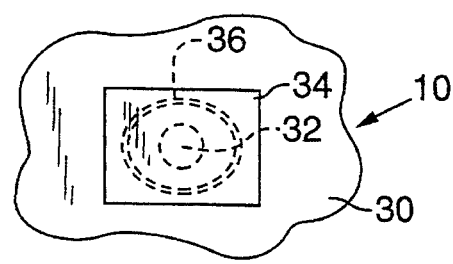
FIG. 5(a) is a plan view of the gas transfer mechanism of FIG. 4.

As another approach for increasing the bulk transfer of air from the interior of a container under vacuum conditions, reference should be made to FIGS. 4, 5 and 5a. As previously explained, the patch 34 is typically secured, as by adhesive, to the container wall 30 about a perimeter 36 which is spaced from the boundary of the aperture 32. Under vacuum conditions, the patch 34 tends to form a bubble, as shown in FIG. 5, whereas in the absence of the vacuum, the patch tends to lay flat against the container wall as shown in FIG. 4. In comparing FIGS. 4 and 5, it is apparent that the area of the underside of the patch 34 exposed to the aperture 32 is increased under vacuum conditions as opposed to the case when a vacuum is not being applied. Due to the increase in exposed area of the patch 34, the gas transfer rate through the patch 34 is increased under vacuum conditions. Consequently, a more rapid escape of air from within the container is permitted when a vacuum is applied and, as a result, more effective cooling of the product contained therein takes place.

Also, the use of an aperture in the container (See FIG. 6) enhances the bulk gas flow under vacuum conditions.

In connection with bulk flow of gases, gases are transferred from the high pressure side of the package to the low pressure side independently of the partial pressure differences of each gas component. For example, if air is bulk transferred from the outside of a package to the inside, enrichment is in the constant ratio of seventy-nine parts nitrogen to twenty-one parts oxygen (the composition of air), regardless of what the internal partial concentrations of these gases are.

As previously mentioned, the package of the present invention can be utilized in conjunction with various means of achieving evaporative cooling. For example, water vapor may simply be allowed to evaporate from an evaporative type cooling collar. In addition, affirmative evaporative cooling may be accomplished by moving air across such a cooling collar. Pressure cooling may also be utilized, involving use of dry air at a higher temperature. In addition, and offering particular advantages, vacuum cooling may be employed to cause the flashing of water vapor from the produce and from an evaporative type cooling collar when air is removed as a vacuum is applied.

It is also possible to charge the package with a desired gas environment. For example, the vacuum may be relieved by charging the vacuum chamber with a desired gas atmosphere having a gas balance which differs from air. For a nonrespiring product in a gas barrier film, the modified atmosphere within the container remains at the charged gas composition for a substantial period of time. For example, the atmosphere may be enriched in carbon dioxide. This charging gas will pass into the container and effectively precharge the container with gas of the desired environment. The charging gases may include a fumigant for destroying fungi, bacteria, insects and other pests that might otherwise damage the packaged product. A number of known fumigants can be used, such as methyl bromide gas for mite control to satisfy export requirements, such as the case for strawberries being shipped to a number of foreign countries. In addition, gases such as carbon monoxide may be used to inhibit enzymes responsible for browning of lettuce, mushrooms and other products. Again, any number of suitable fumigants may be utilized, with other examples including sulfur dioxide and sulfite based materials. Other chemicals for these purposes may be added in liquid or solid form.

Figure 18:
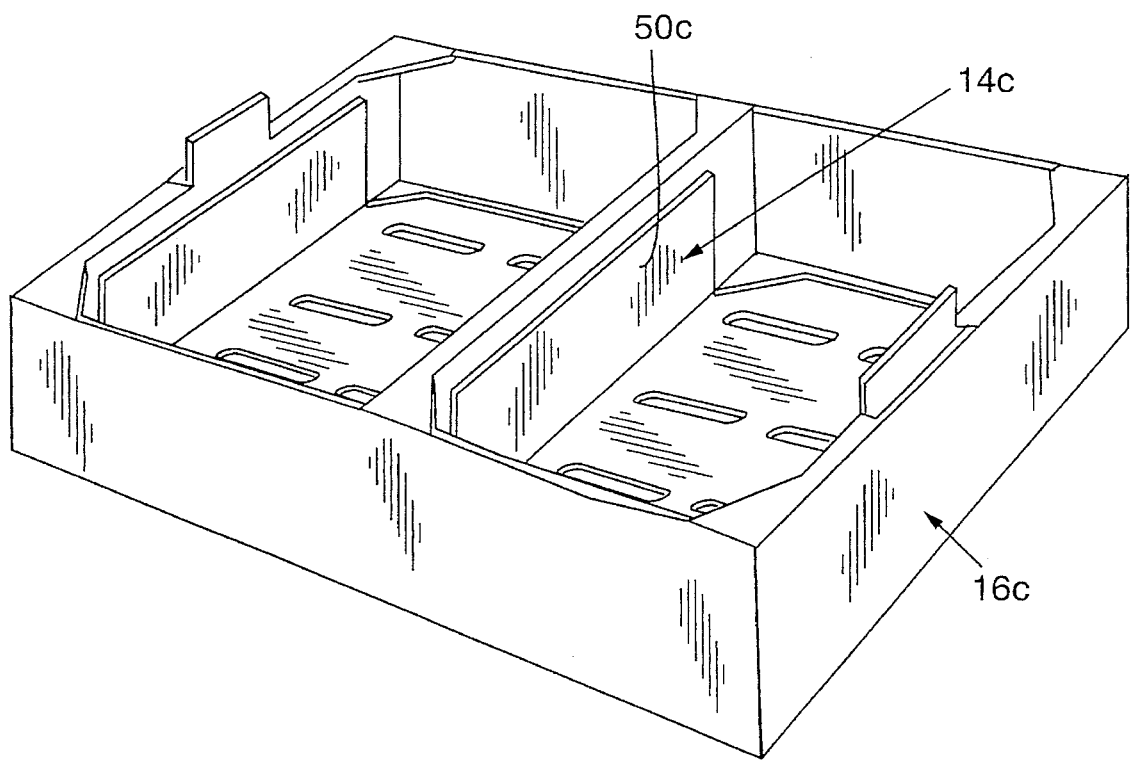
FIG. 18 is a top perspective view of another form of receptacle and cooling element in accordance with the present invention.

FIG. 7 illustrates another form of package in accordance with the present invention with corresponding elements being assigned the same numbers as in FIG. 1, but with the added subscript "a". In this case, a somewhat smaller container 10a, in comparison to the container 10 of FIG. 1, is shown with strawberries 12a therein. The cooling collar 14a in this case is formed into a box-like configuration with a water absorbing substrate 50a at one surface of this form of cooling element. In the FIG. 7 package, the receptacle 16 is comprised of a first receptacle 16a for receiving the container 10a and cooling collar 14a therein and a larger receptacle 16b for receiving plural, in this case four, of the containers 16a and contents. Yet another form of package is indicated in FIG. 18 with corresponding elements indicated by the same number with the added subscript "c".

Figure 8:
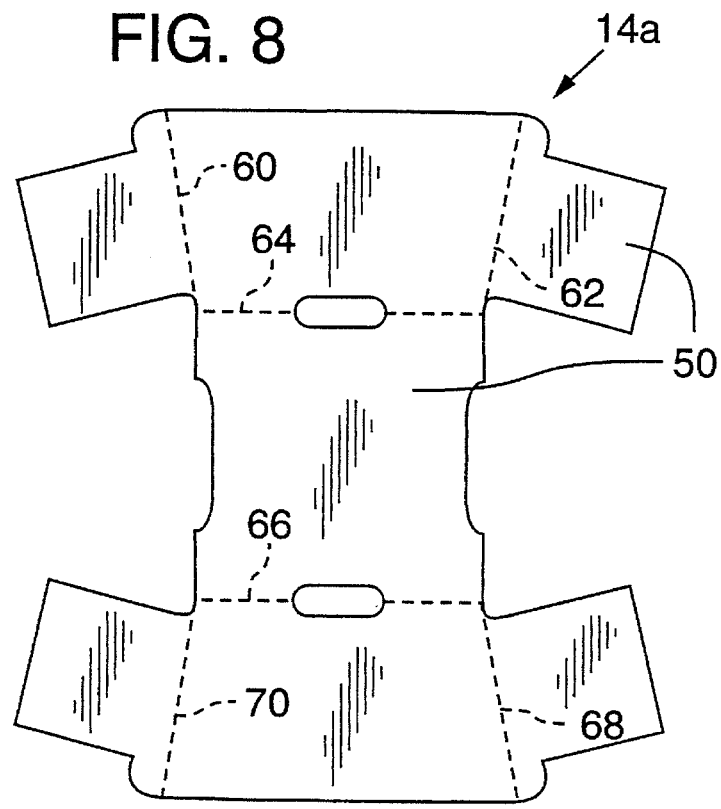
FIG. 8 is a plan view of a cutout blank which may be formed into the cooling element of the package of FIG. 7.

FIG. 8 illustrates a corrugated board blank used in forming the cooling collar 14a of FIG. 7. When folded along perforations 60, 62, 64, 66, 68 and 70, the cooling collar 14a takes the form of a box which may include the water holding substrate 50 on all of its interior surfaces. During use, the collars 14a, as well as collars of the form 14 shown in FIG. 1, and 14c in FIG. 18, are typically inverted (substrate 50, 50a, 50c side down) and floated in a pool of liquid, such as water, so that these collars become at least partially saturated. To expedite this wetting procedure, the blanks used to form the collars 14, 14a and 14c may be carried by a conveyer across the surface of a pool of water with the substrate 50 in contact with the water so as to wet the substrate without wetting the remaining surfaces of the collar. However the entire collar may be wetted if desired.

Figure 9:
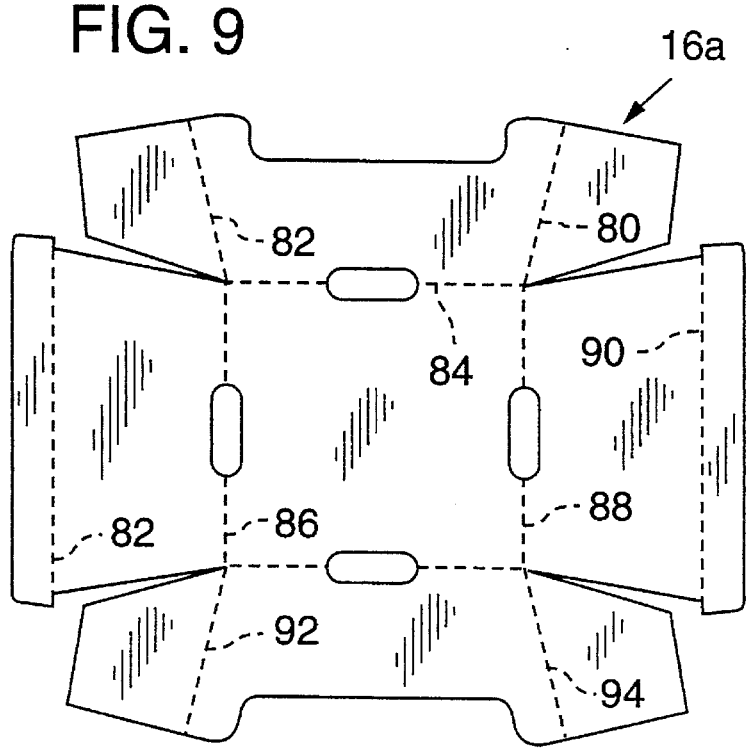
FIG. 9 is a plan view of a cutout blank which may formed into the receptacle of the package of FIG. 7.

FIG. 9 illustrates a corrugated board blank for one of the receptacles 16a which, if folded along perforations 80–94 forms another box-like structure for receiving the cooling collar and container.

Figure 10:
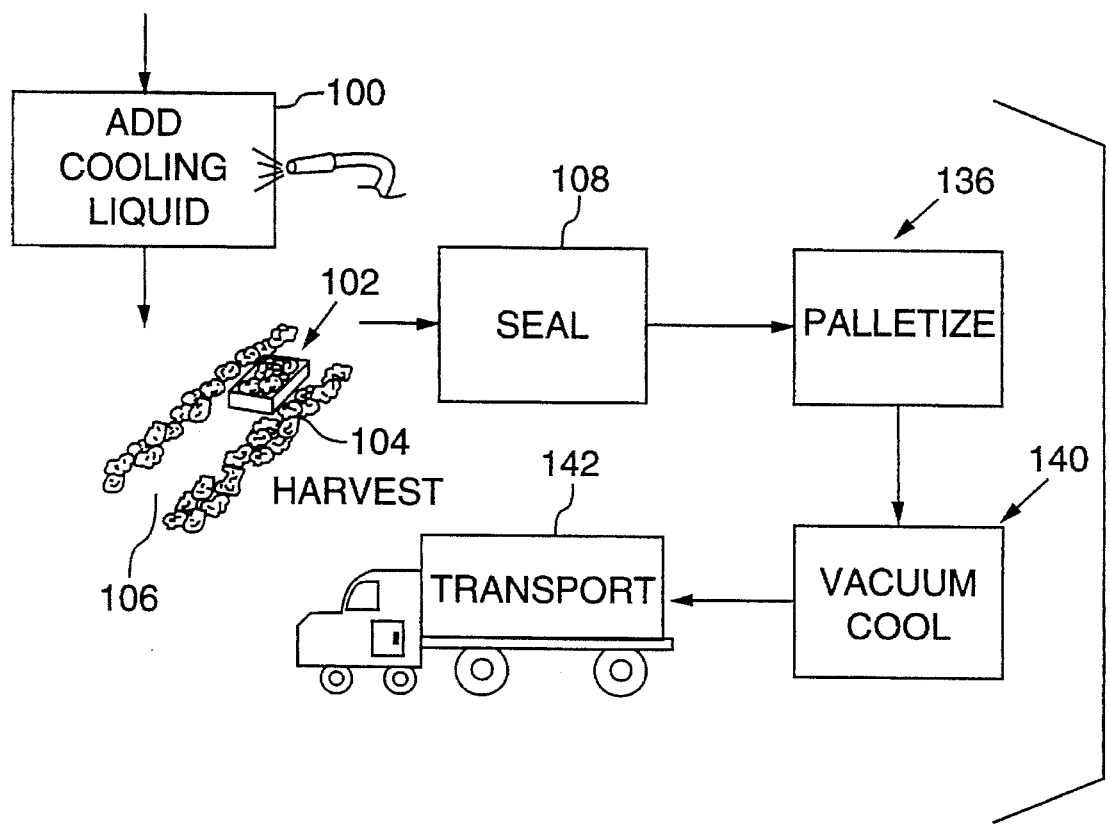
FIG. 10 is a schematic illustration of the use of the package in a field packing application.

With reference to FIG. 10, a typical method in accordance with the present invention will be described. In this case, at a location 100 a cooling liquid, such as water, is added to the cooling collar. This may be accomplished by at least partially saturating the substrate 50 of the cooling collars 14, 14a, 14c (FIGS. 1, 7, 18). Liquid is typically added to the cooling collars in the field, that is at the location where the products are to be harvested. Following the addition of the cooling liquid, (or in the case of the collar 14b following the chilling or freezing of the collar) the packages are typically assembled. That is, open containers 10, 10a are placed in respective cooling collars 14, 14a, 14b, 14c and in the receptacles 16 or 16a and 16b. The assembled containers, one being indicated at 102 in FIG. 10, are then taken by the produce harvesters and filled with produce, such as strawberries from a row 104. The strawberries are sorted by the picker and placed directly into the open containers 10, 10a. Evaporation of liquid from the cooling collars 14, 14a, and 14c (and heat transfer to the chilled collar 14b, if this type of collar is used) helps to cool the berries as they are being harvested.

In a typical commercial strawberry field, plastic or other ground covering 106 is placed on the ground between the plants so that the berries are clean. Thus, the berries being placed in the containers 10, 10a are clean and attractive for marketing purposes. The picker, when containers 10 and 10a are full, typically takes the filled package to a sealing location, indicated at 108, at which time the controlled atmosphere packages 10, 10a are closed.

Figure 11:
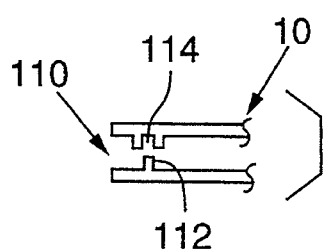
FIG. 11 is a cross-sectional view illustrating one form of mechanical fastening mechanism suitable for use in sealing containers.
Figure 12:
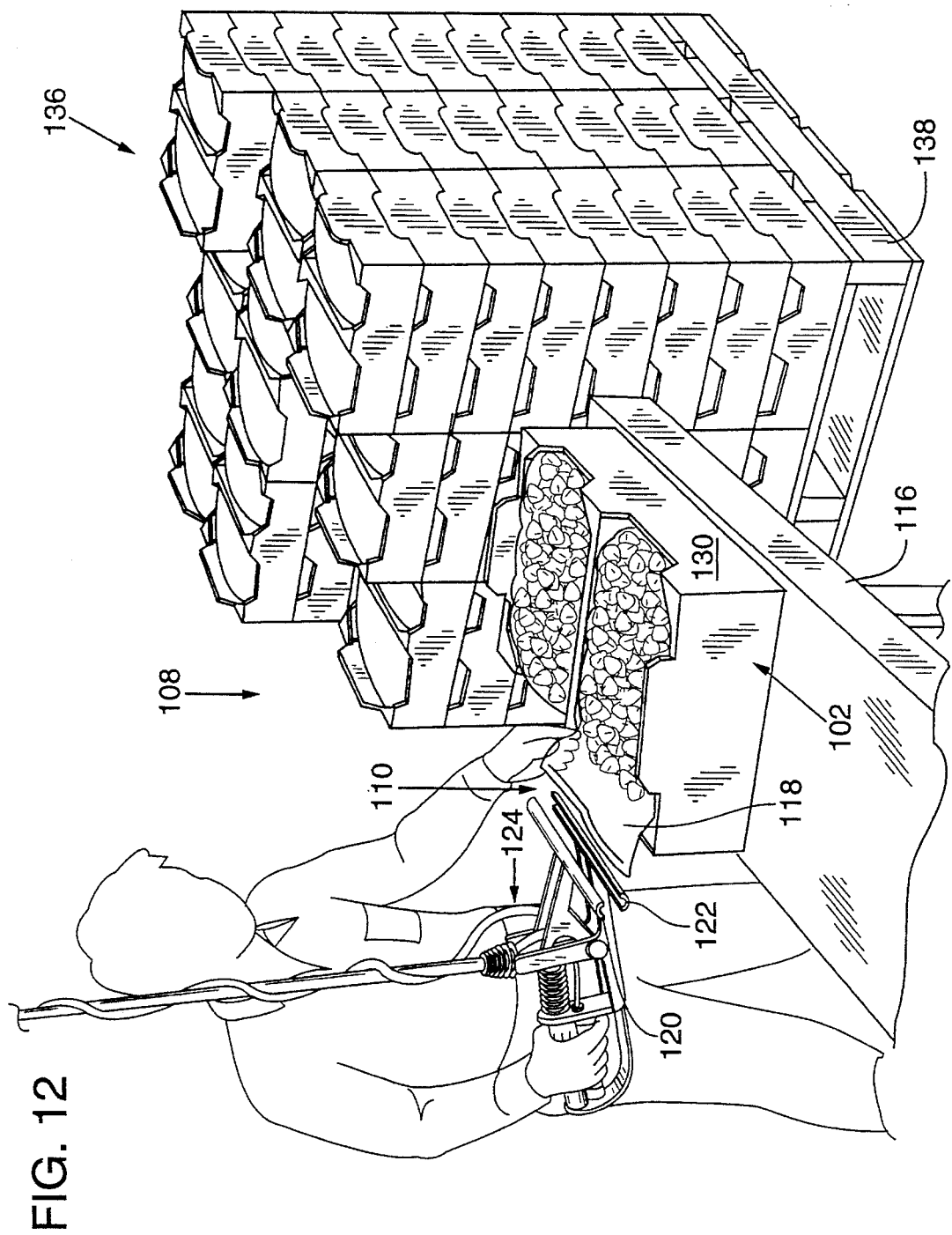
FIG. 12 illustrates palletized packages and also illustrates heat sealing of the container used in the method of the present invention.

The containers may be provided with mechanical fastening mechanisms for use in sealing the containers. One such mechanism is shown in FIG. 11 and is indicated by number 110 as comprising a common "zip-lock" type mechanism having an elongated bead 112 which fits within and mates with an elongated groove 114 formed in the container 10. This mechanism may be provided in a strip of material secured to the container. Although mechanical seals may provide the sole sealing for the containers 10, 10a, films of this type are typically of a heat sealable material. Consequently, as shown in FIG. 12, a filled package 102 may simply be placed on a table 116 with the open end of the container 10, 10a being exposed for positioning between heating elements 120, 122 of an electrically powered heater 124. With the end 118 of the bag clasped between the bars 120 and 122, the bag is closed by heat sealing. Of course, ultrasonic and other sealing approaches may also be used. For example, commercially available cable ties, such as Part No. 95476 ties from Consolidated Plastics Company of Twinsburg, Ohio have proven suitable. In addition, the mechanical fastening mechanism 110, although helpful in preliminarily closing the bags so that ends 118 may be oriented easily for heat sealing, is not necessary. After sealing, the now sealed end of the bag 118 is typically tucked into the receptacle.

As shown in FIG. 12, the receptacles may be printed with brand identifying indicia or advertising material, as indicated at 130, so that the produce can be displayed at its end destination, such as at retail stores, in these receptacles. As also shown in FIGS. 10, 12, following sealing, the packaged products may be palletized, that is, stacked in tiers on a pallet 138 as shown in FIG. 12. This approach minimizes the number of times that the produce is handled following harvest. That is, the only direct handling of the produce occurs at the time it is picked and initially placed in the container and then again at the restaurant or other end location when the produce is actually used. Also, the modified atmosphere container typically remains intact until the individual containers of produce are used. Although the produce has been placed in modified atmosphere containers, evaporation of liquid from the form of cooling collars 14, 14a continues to cool the produce. In a like manner, heat transfer to the FIG. 17 form of cooling collar also continues to cool the produce.

Following the optional palletizing step, the packaged product is moved to a vacuum cooler of a conventional type. The vacuum cooler may be located at the field, that is in proximity to the location where the product is harvested, or at a remote site. The packaged product is subjected to vacuum cooling to further cool the product until transported, as indicated by vehicle 142 in FIG. 10, during distribution of the product.

Finally, to provide a further explanation the present invention, a specific example is described below. In connection with this example, a four-unit retail flat of the type shown in FIG. 7 was used. Each container 10a of this flat was packed with approximately one thousand grams of strawberries. The film utilized in the container 10a was ethylene vinyl alcohol (EVOH) having a twelve micron thickness and being approximately of a twelve inch by five and one-half inch by six inch size. The patch 34 (FIG. 4) comprised forty-two pound bleached liner paper in the form of a one and one-fourth inch by one and one-fourth inch label with a one-quarter inch diameter adhesive-free circular area applied positioned over a one-sixteenth inch diameter perforation in the film (the perforation corresponding to aperture 32 in FIG. 5). Over the aperture, the gas transfer coefficient (diffusion) was measured as 80 mL/hr/atm while the Gurly (bulk flow) was measured at 560 sec/100 mL. In addition, the cooling collar 14a (FIG. 7) was partially saturated with approximately 100 grams of water with the assembly being placed in one of the containers 16a. Testing revealed the steady-state internal atmosphere of this container was approximately seven percent $CO_2$ and sixteen percent $O_2$ at 40° F.

When a package of this type including a cooling collar is stored in a well-ventilated area, the temperature of the cooling collar approaches the wet bulb temperature of the surrounding air. For example, in Watsonville, Calif., where the average high temperature in June is 70° F. and the average relative humidity is fifty percent, the wet bulb temperature is approximately 60° F. It has been found that after two hours under these conditions, strawberry packages with a cooling collar as described above are on the average 3.5° F. cooler than those without collars.

When subjected to a vacuum, to minimize bursting problems of the container 10a, the porous membrane typically has a Gurly flow of greater than 0.2 mL/sec (100 mL/560 sec). This Gurly flow is also achieved by placing an oversized porous label, for example one-quarter inch in diameter, over a one-sixteenth inch diameter perforation in the film. As previously explained, under vacuum conditions this label bubbles out to expose the entire one-quarter inch diameter porous material, but then returns to a flat position under ambient conditions. Also, as previously explained, a small aperture may be used for this purpose.

In a conventional vacuum cooling process (e.g. no cooling collar or other cooling element), all of the heat removed from a product is contained in the water vapor and is removed from the product or from any water sprayed onto the product. With a modified atmosphere package, the removal rate of heat from the product would therefore be limited by the rate at which water vapor would pass through the porous membrane, which in turn is related to its Gurly number, or to the rate water vapor is otherwise collected within the container. If a cooling collar is used, a condensing surface is created on an interior surface of the modified atmosphere container. This allows the water vapor inside the container to give up its heat (while condensing) to the cooling collar so as to enable a much more rapid heat transfer. In addition, the cooling collar removes heat by conduction at points of contact with the container. It has been observed that after either a fifteen minute or thirty minute vacuum cycle, the temperature drop of a package which combines a modified atmosphere container with a cooling collar is three to four times greater than the case without a cooling collar. In addition, it has been observed that this method of cooling (utilizing a cooling element in combination with a modified atmosphere package) appears to be gentler on strawberries than a conventional vacuum cooling process. Although the reason is not entirely clear, it is quite possible that evacuation shock and cell rupture of the berries is reduced and that freezing is minimized since no berry can be colder than the cooling collar.

Also, after about fifteen minutes in a vacuum tube, (an open, e.g. conventional modified atmosphere package) would be approximately 6° cooler if a cooling collar is used than if one is not used. Thus, a cooling collar may be used to speed up the cycle time of vacuum cooling. In addition, with such a cooling collar, cooling has been observed to continue for several hours after removal from the vacuum tube as heat continues to transfer to the collar. Early observations suggest that the equilibrium (two-hour) temperature drop using a liquid evaporative type cooling collar in combination with a fifteen minute vacuum cycle is comparable to that from the use of a thirty minute vacuum cycle without a cooling collar.

Mature (full color) strawberries packaged in this manner have maintained their peak quality for eating up to three weeks from packaging. Presently, the maximum strawberry life is about seven to ten days even if the berries are less mature when picked (green). Although this example has been described in connection with strawberries, the invention is not limited to this particular type of produce. As another specific example, broccoli packaged in this manner has maintained its quality and freshness for the duration of a twenty-one day test period, with the maximum duration not yet having been determined.

To provide further evidence of the effectiveness of the present invention, room temperature strawberries were placed in a modified atmosphere container and the container was closed. The container was then subjected to cooling for thirty minutes under conditions indicated by Table III below and with the results being set forth in this table.

TABLE III

STRAWBERRY COOLING IN A
CLOSED MODIFIED ATMOSPHERE CONTAINER
(EVOH Film with an Aperture)

| Cooling Element Type | Area* | Vacuum Applied During Cooling Cycle | Average Packed Strawberry Temperature | | |
|---|---|---|---|---|---|
| | | | Initial | Final | Change |
| Frozen Sealed Cooling Collar (14b type)** | 120 | No | 66.6 | 52.0 | 14.6 |
| Frozen Sealed Cooling Collar (14b type)** | 120 | Yes | 65.0 | 36.8 | 28.2 |
| Wet Fiber Cooling Collar (14a type) | 50 | Yes | 67.8 | 37.2 | 30.6 |
| None | | Yes | 66.9 | 59.6 | 7.3 |

*In square inches per pound of packaged fruit
**commercially available Blue Ice ™ packaged sealed cooling elements frozen at a temperature of 15° F.

From the above table it is apparent that vacuum cooling of room temperature strawberries is simply ineffective without a cooling collar. Also, the use of a sealed cooling element without vacuum cooling of the strawberries offered an improvement over the cooling element-less vacuum cooling approach. Moreover, the combination of vacuum cooling with a cooling element (of either the sealed or evaporative cooling type) was extremely effective in cooling the strawberries. Also, the evaporative cooling type of cooling element required far less surface area than the sealed type cooling element to accomplish the substantially same result.

Having illustrated and described the principles of our invention with reference to several preferred embodiments, it should be apparent to those of ordinary skill in the art that the invention may be modified in arrangement and detail without departing from such principles. We claim as our invention all such modifications which fall within the scope of the following claims.

We claim:

1. A method of packaging perishable food or horticultural products comprising:

enclosing the products in a container which controls the flow of gas between the interior and exterior of the container so as to provide a modified gas atmosphere within the container;

transferring heat from the container to a heat sink placed in proximity to the exterior of the container to cool the exterior of the container; and vacuum cooling the container while the container is in proximity to the heat sink to accelerate the cooling of the products within the container.

2. A method according to claim 1 which includes the step of manually transporting the container and heat sink in the field during harvesting of the products into the container prior to enclosing the products in the container.

3. A method according to claim 1 which includes the step of placing harvested products directly into the container and enclosing the products without precooling the products.

4. A method according to claim 1 which includes the step of contacting a major portion of the exterior surface of the container with the heat sink.

5. A method according to claim 1 including the step of placing a sealed liquid or phase change material containing heat sink in proximity to the container.

6. A method according to claim 5 including the step of placing the sealed liquid or phase change material containing heat sink in contact with the container.

7. A method according to claim 1 including the step of placing a frozen heat sink in proximity to the container.

8. A method according to claim 7 including the step of placing a frozen heat sink in contact with the container.

9. A method according to claim 1 including the step of at least partially surrounding the exterior of the container with a heat sink.

10. A method according to claim 1 including the step of surrounding a major portion of the exterior of the container with a heat sink.

11. A method according to claim 10 including the step in which the surrounding step comprises the step of surrounding a major portion of the exterior of the container with a frozen heat sink.

12. A method according to claim 1, including the step of surrounding a major portion of the exterior of the container with a frozen cooling element in proximity to the exterior of the container so as to cool the products within the container.

13. A method according to claim 12 in which the placing step comprises the step of contacting the exterior of the container with the frozen cooling element.

14. A method of packaging perishable food or horticultural products comprising:

sizing a container, receptacle and cooling element so as to be manually transportable by an individual;

enclosing the products in the sized container which container controls the flow of gas between the interior and the exterior of the container so as to provide a modified gas atmosphere within the container;

positioning the container within the cooling element which surrounds and contacts a major portion of the exterior of the container;

positioning the container and cooling element within the receptacle; and vacuum cooling the container while within the cooling element and receptacle.

* * * * *